(12) United States Patent
Jun (10) Patent No.: US 10,766,366 B2
(45) Date of Patent: Sep. 8, 2020

(54) OPERATING METHOD FOR AN OPERATING AND DISPLAY DEVICE IN A VEHICLE AND OPERATING AND DISPLAY DEVICE IN A VEHICLE

(71) Applicant: VOLKSWAGEN AG, Wolfsburg (DE)

(72) Inventor: Mi-Ran Jun, Berlin (DE)

(73) Assignee: Volkswagen AG, Wolfsburg (DE)

( * ) Notice: Subject to any disclaimer, the term of this patent is extended or adjusted under 35 U.S.C. 154(b) by 210 days.

(21) Appl. No.: 14/913,253

(22) PCT Filed: Aug. 20, 2013

(86) PCT No.: PCT/EP2013/067289
§ 371 (c)(1),
(2) Date: Feb. 19, 2016

(87) PCT Pub. No.: WO2015/024589
PCT Pub. Date: Feb. 26, 2015

(65) Prior Publication Data
US 2016/0200195 A1    Jul. 14, 2016

(51) Int. Cl.
*G06F 3/048* (2013.01)
*B60K 37/06* (2006.01)
(Continued)

(52) U.S. Cl.
CPC .............. *B60K 37/06* (2013.01); *B60K 35/00* (2013.01); *G06F 3/0482* (2013.01);
(Continued)

(58) Field of Classification Search
CPC .. G06F 3/0482; G06F 3/0488; G06F 3/04847; G06F 3/04883; G06F 3/048
See application file for complete search history.

(56) References Cited

U.S. PATENT DOCUMENTS 7,218,312 B2 * 5/2007 Takaku ................ G06F 3/0219
345/158
9,367,205 B2 * 6/2016 Hinckley ............ G06F 3/04817
(Continued)

FOREIGN PATENT DOCUMENTS

DE       3514438 C1    9/1986
DE   102008052485 A1   4/2010
(Continued)

OTHER PUBLICATIONS

Search Report and Written Opinion for International Patent Application No. PCT/EP2013/067289; dated Jun. 3, 2014.

*Primary Examiner* — Mahelet Shiberou
(74) *Attorney, Agent, or Firm* — Barnes & Thornburg LLP (57) ABSTRACT

An operating method in a vehicle having a menu of an operating structure displayed on a display surface arranged in the vehicle. The operating structure includes a main menu and additional menus. Inputs can be detected, by which a change of the displayed menu can be caused and by which switching elements of the menus can be actuated. A special switching element is displayed at the edge of the display surface which can be actuated by a swipe gesture and, if the swipe gesture associated with the special switching element has been detected, the main menu is displayed. Also disclosed is an operating device for performing the operating method.

17 Claims, 8 Drawing Sheets

(51) Int. Cl.
*G06F 3/0484* (2013.01)
*G06F 3/0488* (2013.01)
*B60K 35/00* (2006.01)
*G06F 3/0482* (2013.01)

(52) U.S. Cl.
CPC ...... *G06F 3/04847* (2013.01); *G06F 3/04883* (2013.01); *G06F 3/04886* (2013.01); *B60K 2370/11* (2019.05); *B60K 2370/146* (2019.05); *B60K 2370/1438* (2019.05); *B60K 2370/1442* (2019.05)

(56) References Cited

U.S. PATENT DOCUMENTS

| | | | | |
|---|---|---|---|---|
| 2005/0012723 A1* | 1/2005 | Pallakoff | ............... | G06F 1/1616 345/173 |
| 2005/0195173 A1* | 9/2005 | McKay | ............... | G06F 1/16 345/173 |
| 2006/0112353 A1* | 5/2006 | Okamoto | ............... | G06F 3/0488 715/810 |
| 2006/0158426 A1* | 7/2006 | Hagiwara | ............... | G06F 3/044 345/156 |
| 2006/0171675 A1* | 8/2006 | Kolletzki | ............... | H04N 21/44222 386/230 |
| 2006/0238517 A1* | 10/2006 | King | ............... | G06F 1/1626 345/173 |
| 2007/0088465 A1* | 4/2007 | Heffington | ............... | G07C 5/085 701/1 |
| 2008/0057926 A1* | 3/2008 | Forstall | ............... | G06F 3/0482 455/415 |
| 2008/0074399 A1* | 3/2008 | Lee | ............... | G06F 3/0482 345/173 |
| 2008/0148182 A1* | 6/2008 | Chiang | ............... | G06F 3/0482 715/810 |
| 2008/0207188 A1* | 8/2008 | Ahn | ............... | G06F 3/04847 455/418 |
| 2008/0297483 A1* | 12/2008 | Kim | ............... | G06F 3/04817 345/173 |
| 2010/0106367 A1* | 4/2010 | Kolletzki | ............... | H04N 5/44543 701/36 |
| 2010/0131880 A1* | 5/2010 | Lee | ............... | G06F 3/04842 715/769 |
| 2010/0248787 A1* | 9/2010 | Smuga | ............... | G06F 3/0482 455/566 |
| 2012/0011437 A1* | 1/2012 | James | ............... | G06F 1/1643 715/702 |
| 2012/0174033 A1* | 7/2012 | Joo | ............... | G06F 3/0482 715/831 |
| 2012/0284673 A1* | 11/2012 | Lamb | ............... | G06F 3/04883 715/863 |
| 2013/0019173 A1* | 1/2013 | Kotler | ............... | G06F 3/0482 715/711 |
| 2013/0019175 A1* | 1/2013 | Kotler | ............... | G06F 3/0482 715/728 |
| 2013/0179840 A1* | 7/2013 | Fisher | ............... | G06F 3/04842 715/835 |
| 2013/0318478 A1* | 11/2013 | Ogura | ............... | G06F 3/0488 715/841 |
| 2014/0088827 A1* | 3/2014 | Yashiro | ............... | B60L 3/12 701/36 |
| 2014/0304636 A1* | 10/2014 | Boelter | ............... | G06F 3/04883 715/771 |
| 2014/0380243 A1* | 12/2014 | Furue | ............... | G06F 3/0482 715/835 |
| 2015/0020109 A1* | 1/2015 | Higa | ............... | H04N 21/4312 725/47 |
| 2016/0370958 A1* | 12/2016 | Tsuji | ............... | G06F 3/0486 |

FOREIGN PATENT DOCUMENTS

| | | |
|---|---|---|
| DE | 102009059866 A1 | 6/2011 |
| EP | 1935704 A1 | 6/2008 |
| EP | 2246214 A1 | 11/2010 |
| JP | 2003202951 A | 7/2003 |
| JP | 2011084197 A | 4/2011 |
| JP | 2012059296 A | 3/2012 |
| WO | 2009143076 A2 | 11/2009 |
| WO | 2013053466 A2 | 4/2013 |

\* cited by examiner

OPERATING METHOD FOR AN OPERATING AND DISPLAY DEVICE IN A VEHICLE AND OPERATING AND DISPLAY DEVICE IN A VEHICLE

PRIORITY CLAIM

This patent application is a U.S. National Phase of International Patent Application No. PCT/EP2013/067289, filed 20 Aug. 2013, the disclosure of which is incorporated herein by reference in its entirety.

FIELD

Illustrative embodiments relate to an operator control method in a vehicle, in which a display panel arranged in the vehicle is used to display a menu for an operator control structure. In this case, the operator control structure comprises a main menu and a multiplicity of further menus. In addition, inputs can be captured that can bring about alteration of the displayed menu and that can actuate switching elements of the menus. Furthermore, the illustrative embodiments relate to an operator control apparatus in a vehicle having a display panel and a memory that stores data pertaining to an operator control structure that comprises a main menu and a multiplicity of further menus. In addition, the operator control apparatus has a control apparatus that is coupled to the memory and to the display panel and that can be used to produce graphics data pertaining to the display of the menus on the display panel. Furthermore, the operator control apparatus comprises an input apparatus that can be used to capture inputs that can bring about alteration of the displayed menu and that can actuate switching elements of the menus.

BACKGROUND

A vehicle contains various information and communication devices whose displays and information need to be presented. The size of the display panels that can be accommodated in the vehicle, so that particularly the driver of the vehicle can read off the displays, is very limited. To present the many and diverse operator control and display options, therefore, e.g. hierarchic operator control structures are used. A hierarchic operator control structure contains a multiplicity of menus that each have various associated menu items, alphanumeric information presentations and/or graphics. When a menu item is selected, a menu on a lower level of the hierarchic operator control structure, what is known as a submenu, opens. This submenu in turn comprises a plurality of submenu items. This structure can be continued over a plurality of hierarchy levels, so that the result is a complex ramification for the display on the display panel. Despite the complexity of the operator control structure, the user is intended to be able to use the operator control apparatus in the vehicle simply and intuitively.

Illustrative embodiments provide an operator control method and an operator control apparatus of the type stated at the outset that provide facilitated operator control for the user.

BRIEF DESCRIPTION OF THE FIGURES

An exemplary embodiment of the disclosed operator control method and of the disclosed operator control apparatus is explained below with reference to the drawings.

DETAILED DESCRIPTION OF THE DISCLOSED EMBODIMENTS

In the disclosed operator control method, for at least a plurality of menus from the multiplicity of menus of the operator control structure, a special switching element is displayed at the edge of the display panel, which special switching element can be actuated by a swipe gesture. When the swipe gesture associated with the special switching element has been sensed, the main menu is displayed.

The disclosed method makes it a simple and intuitive matter for the user to arrive at the main menu quickly and simply, even if the operator control structure is very complex. Regardless of where the user is in the operator control structure, he can use a simple swipe gesture to actuate the special switching element to quickly return to the main menu again.

For purposes of the present disclosure, a switching element or a special switching element means a control element of a graphical user interface. A switching element differs from elements and panels for the pure display of information, what are known as display elements, in that they are selectable. When a switching element is selected, a function associated therewith is carried out. The function can just result in alteration of the information display. In addition, the switching elements can be used to control devices whose operator control is supported by the information display. The switching elements can therefore replace conventional mechanical switches. The switching elements can be arbitrarily produced for a freely programmable display panel and displayed thereby. Furthermore, provision may be made for a switching element to be able to be marked. In this case, the associated function is not yet carried out. The marked switching element is presented in highlight in comparison with other switching elements, however. Only when the switching element is selected is its associated function carried out.

According to at least one disclosed embodiment of the method, the operator control structure is a hierarchic operator control structure in which the main menu is arranged on the hierarchically highest level. The main menu can therefore comprise a plurality of menu entries that, when actuated, call a menu on a level that is arranged further down in the hierarchy. This hierarchic operator control structure can extend over a plurality of hierarchy levels. Precisely in the case of such an operator control structure, it is sometimes difficult for the user to orient himself. When the operator control structure is used in a vehicle, orientation is additionally complicated by the fact that for operator control by the driver of the vehicle, the driver must not be distracted from driving when using devices in the vehicle. In this case, the disclosed method allows particularly the driver of the vehicle to use the special switching element and the swipe gesture to arrive at the main menu again simply and intuitively.

According to at least one disclosed embodiment of the method, for all menus of the operator control structure apart from the main menu, the special switching element is displayed at the edge of the display panel. This allows the user, in all menus, to use the swipe gesture that is associated with the special switching element to return to the main menu again simply and quickly.

According to at least one disclosed embodiment of the method, the special switching element is displayed in the same position for all menus apart from the main menu. The effect achieved by this is that the user recognizes the special switching element in each menu simply and intuitively. This simplifies orientation in the individual menus.

According to a further disclosed embodiment of the operator control method, the special switching element is displayed on the display panel for all presentations apart from the presentation of the main menu. In this case, the main menu can be displayed simply and intuitively by means of the swipe gesture not only when menus are displayed but also in the case of simple information presentations.

The special switching element is particularly a bar that is presented on the display panel. In this case, the longitudinal edge of the bar is arranged at the edge of the display panel. The special switching element is particularly arranged at the upper edge of the display panel.

According to at least one disclosed embodiment of the method, after the actuation of the special switching element has been sensed, the main menu, when displayed on the display panel, is moved, within a first interval of time, into the display from the edge at which the special switching element is displayed, so that the main menu takes up an increasing area of the display panel as time progresses and at the same time the previously displayed menu disappears as time progresses. After the first interval of time has elapsed, only the main menu is then displayed. In this way, the user can sense the change of menu particularly simply, which in turn facilitates orientation in the operator control structure.

If, in at least one disclosed embodiment of the method, no input from a switching element of the main menu has been sensed within a second interval of time, the menu displayed prior to the main menu is displayed again. This allows the user to automatically return to the last menu again without a further operator control process if he does not wish to actuate a switching element of the main menu.

The disclosed method allows the swipe gesture to be carried out on a touch-sensitive surface of the display panel, for example. Alternatively or additionally, the swipe gesture can be carried out in a detection space in front of the display panel.

In the disclosed operator control apparatus, the control apparatus can be used to produce the graphics data for presenting the menus of the operator control structure such that for at least a plurality of menus of the operator control structure, a special switching element is displayed at the edge of the display panel, which special switching element can be actuated by a swipe gesture. If the input apparatus has been used to sense the swipe gesture associated with the special switching element, the control apparatus can be used to produce the graphics data for presenting the menus of the operator control structure such that the main menu is displayed.

The disclosed operator control apparatus is particularly in a form such that it can carry out the aforementioned method steps in part or in full. The operator control apparatus can be used for operator control of various devices in the vehicle. The disclosed operator control apparatus has the same benefits cited above as the disclosed method.

According to at least one disclosed embodiment of the operator control apparatus, the input apparatus comprises a touch-sensitive surface that is arranged on the display panel and on which the swipe gesture can be sensed. Alternatively or additionally, the input apparatus comprises a sensing device that can be used to sense a gesture carried out in a detection area, wherein the detection area is arranged in front of the display panel, in particular.

Furthermore, disclosed embodiments relate to a vehicle, particularly a motor vehicle that has the disclosed operator control apparatus.

Figure 1:
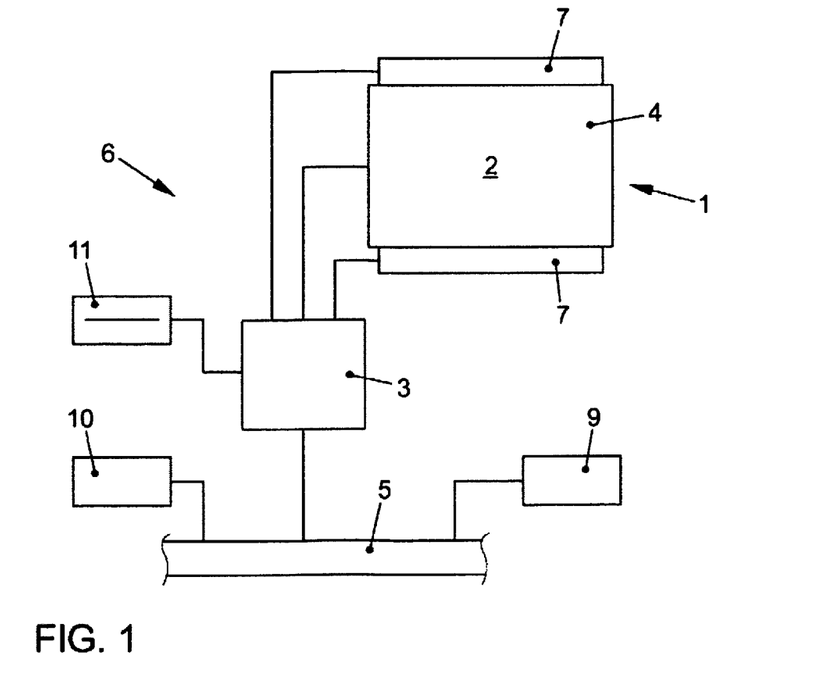
FIG. 1 schematically shows an exemplary embodiment of the disclosed operator control apparatus and the connection of this operator control apparatus to other devices of the vehicle.
Figure 2:
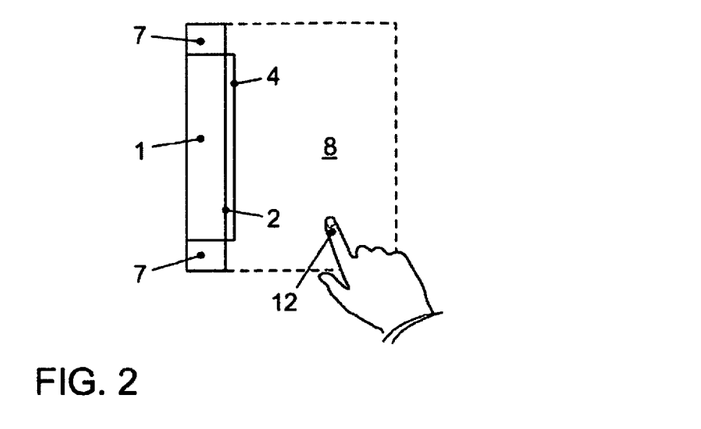
FIG. 2 shows a sectional view of the display apparatus of the exemplary embodiment of the disclosed operator control apparatus.
Figure 3:
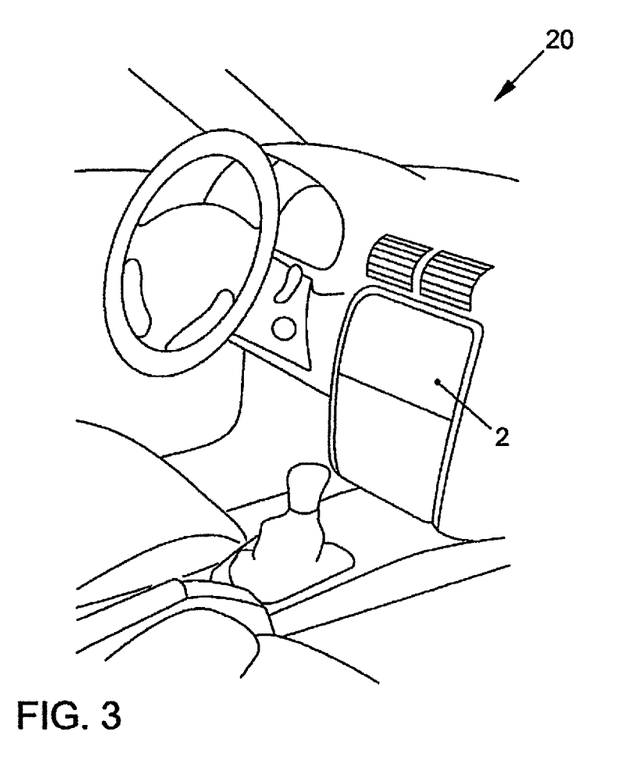
FIG. 3 shows a vehicle with the exemplary embodiment of the disclosed operator control apparatus.

An exemplary embodiment of the operator control apparatus 6 and the arrangement of the exemplary embodiment in a vehicle 20 is first of all explained with reference to FIGS. 1 to 3:

The operator control apparatus 6 comprises a display apparatus 1 having a display panel 2 that is arranged in the interior of the vehicle 20 such that it is clearly visible to at least one vehicle occupant, particularly the driver. The display panel 2 can be provided by a display, particularly a liquid crystal display, of any design.

The operator control apparatus 6 additionally comprises a control apparatus 3 and an input apparatus. The control apparatus 3 is connected to the display apparatus 1. The control apparatus 3 can be used to produce graphics data for the presentation of information on the display panel 2. The input apparatus comprises a touch sensitive surface 4 on the display panel 2. Hence, what is known as a touch screen is provided.

Furthermore, the input apparatus can optionally comprise a sensing device 7. The sensing device 7 can be used to sense the residence and the position of an actuating object 12 in a detection area 8. In addition, the trend in the position, and if need be, of the actuating object 12, in the detection area 8 over time can be sensed, so that different gestures for inputs can be sensed. The detection area 8 is shown in detail in FIG. 2. The detection area 8 is formed such that a gesture that is carried out in front of the display panel 2 can be sensed.

The actuating object 12 may more particularly be the fingertip of a user or the hand of a user. In this way, it is possible to sense swipe gestures by a user. In the case of a swipe gesture, the user moves his fingertips quickly in one direction. This direction of the swipe gesture is also sensed by the sensing device 7 and transmitted to the control apparatus 3. The control apparatus 3 can take the different inputs on the touch-sensitive surface 4 or the inputs that have been sensed using the sensing device 7 as a basis for altering the display on the display panel 2.

The control apparatus 3 is additionally connected to a memory 11. The memory 11 stores data pertaining to a hierarchic operator control structure that has menus on different levels. The hierarchic operator control structure has a main menu that is displayed when the operator control apparatus 6 is switched on or when the vehicle 20 is switched on. This main menu comprises a plurality of menu items. The menu items are switching elements on the display panel 2. When such a switching element is confirmed, a submenu, that is to say a menu on a hierarchically lower level, is then displayed that can again comprise a plurality of menu items in each case. In addition, in the menus or following actuation of a menu item, it is possible to display information that is used for the operator control of devices of the vehicle 20 or that indicates states of devices of the vehicle 20.

To produce these displays within the hierarchic operator control structure, the control apparatus 3 is furthermore coupled to a data bus 5 of the vehicle 20. This data bus 5 connects the control apparatus 3 to further devices 9, 10 of the vehicle 20 that are intended to have information displayed for them on the display panel 2 or that are intended to be operated by means of the operator control apparatus 6. By way of example, the devices 9 and 10 may be a navigation system of the vehicle 20 and a radio of the vehicle 20.

An exemplary embodiment of the disclosed method that can be carried out by the operator control apparatus 6 described above is explained below.

Figure 4:
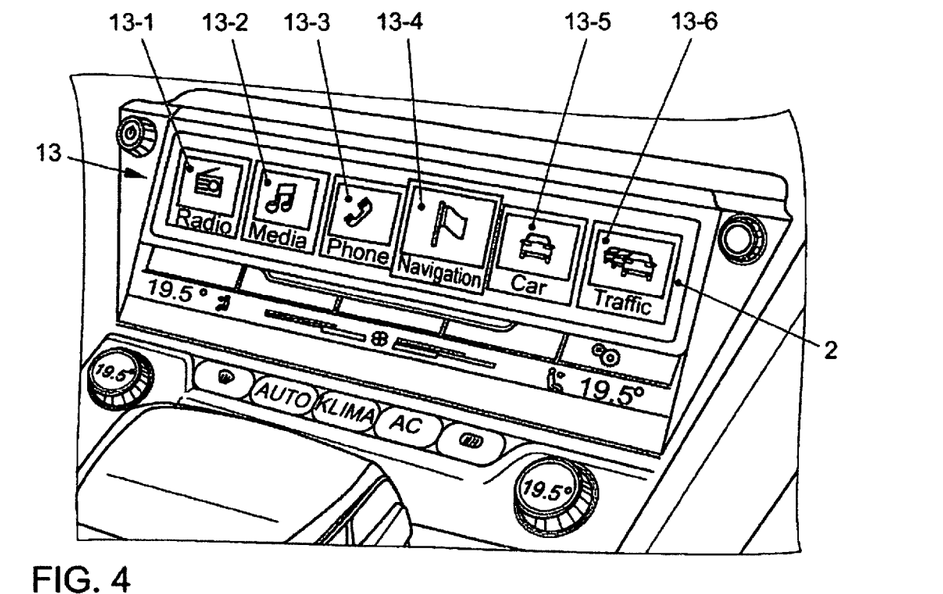
FIGS. 4 to 10 schematically show displays on the display panel of the disclosed operator control apparatus that have been produced by an exemplary embodiment of the disclosed method.

When the vehicle 20 is switched on, that is to say that the ignition is actuated, for example, a main menu 13 is displayed on the display panel 2, as shown in FIG. 4. The main menu 13 comprises a plurality of menu items for which the switching elements 13-1 to 13-6 are displayed. The user can actuate these switching elements 13-1 to 13-6 by using his fingertip 12 to touch the touch-sensitive surface 4 in the area of the respective switching element. The actuation of a switching element is then visualized by virtue of the control apparatus 3 altering the display on the display panel 2 such that the actuated switching element is presented in highlight, for example in enlarged form or in perspective in the foreground, as shown for the "navigation" switching element 13-4 in FIG. 4.

Figure 5:
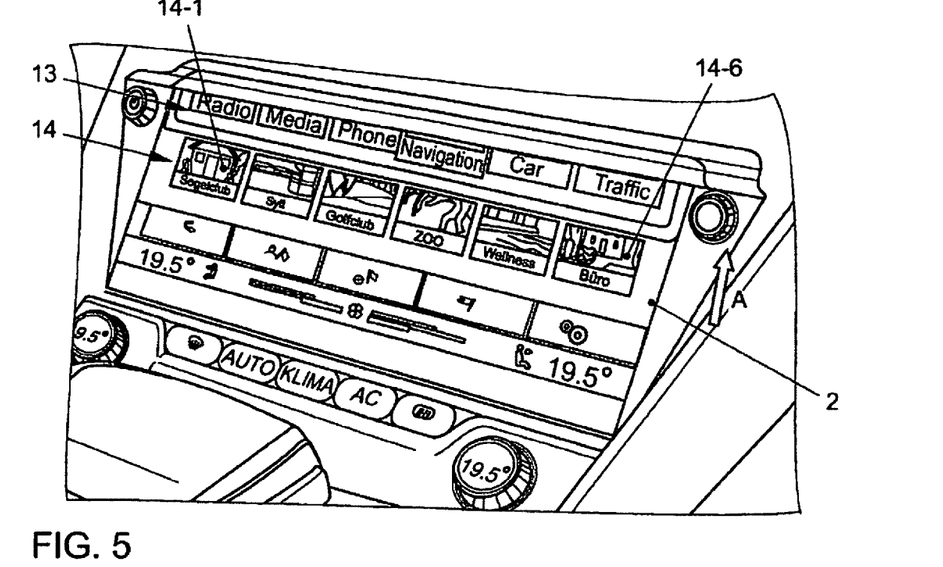
Figure 6:
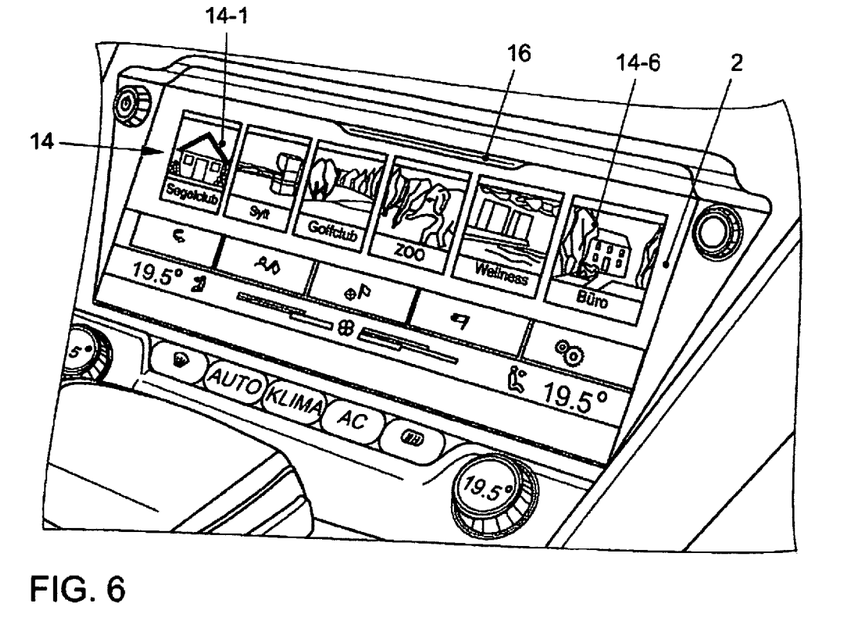

Following actuation of a switching element of the main menu 13, the control apparatus 3 produces an animation on the display panel 2. Such an animation is shown in FIG. 5. The main menu 13 is moved upward in the direction of the arrow A. That is to say that the area taken up by the main menu 13 on the display panel 2 becomes ever smaller within a first interval of time until the main menu 13 is no longer presented after the first interval of time has elapsed. At the same time, a menu 14 appears that is associated with the actuated switching element 13-4. In the case described here, this is a navigation menu 14, as shown in FIG. 6.

The navigation menu 14 in turn comprises a plurality of menu items for which switching elements 14-1 to 14-6 are displayed. In the present case, these are categories of destinations for the navigation system. Furthermore, a special switching element 16 is displayed that can be used by the user to repeatedly return to the main menu 13. The function and actuation of the special switching element 16 are explained in detail later.

Figure 7:
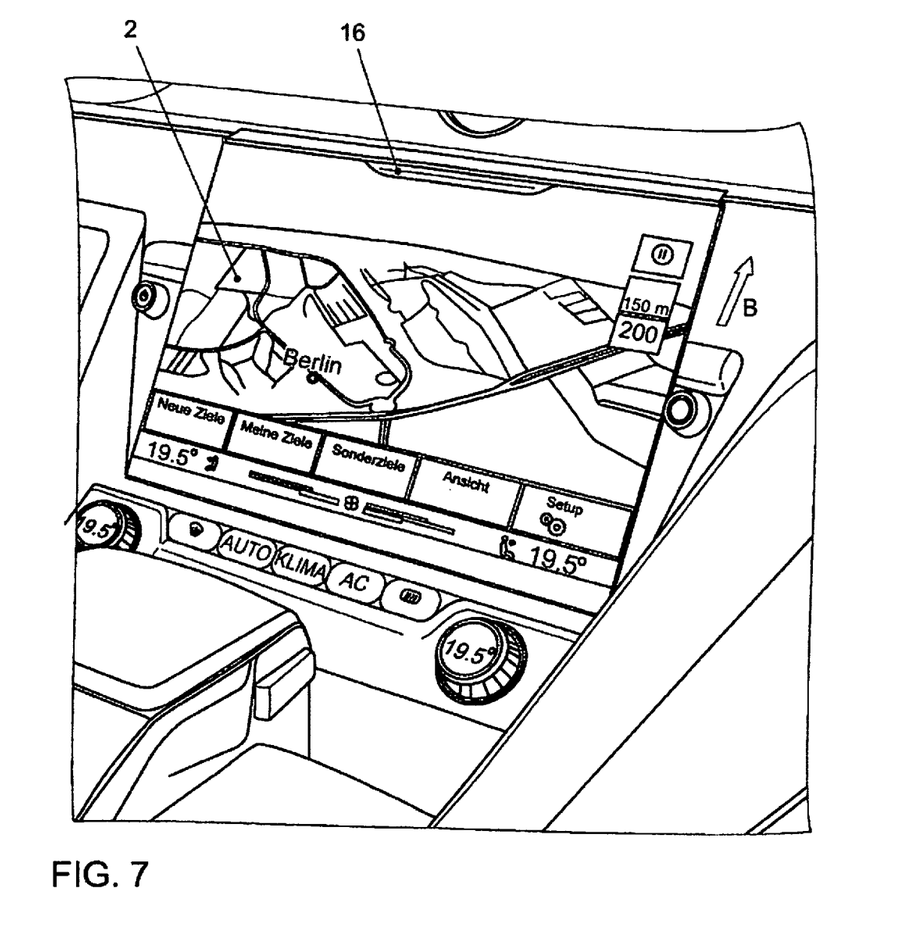

When the user actuates the navigation system in a manner that is known per se such that he wishes to see a geographical map, the control apparatus 3 drives the display apparatus 1 such that the display is moved out further upward. This is shown in FIG. 7. The display of the display apparatus 1 is moved upward in the direction of the arrow B. At the same time, a geographical map is displayed on the display panel 2. In addition, the special switching element 16 is displayed again.

Figure 8:
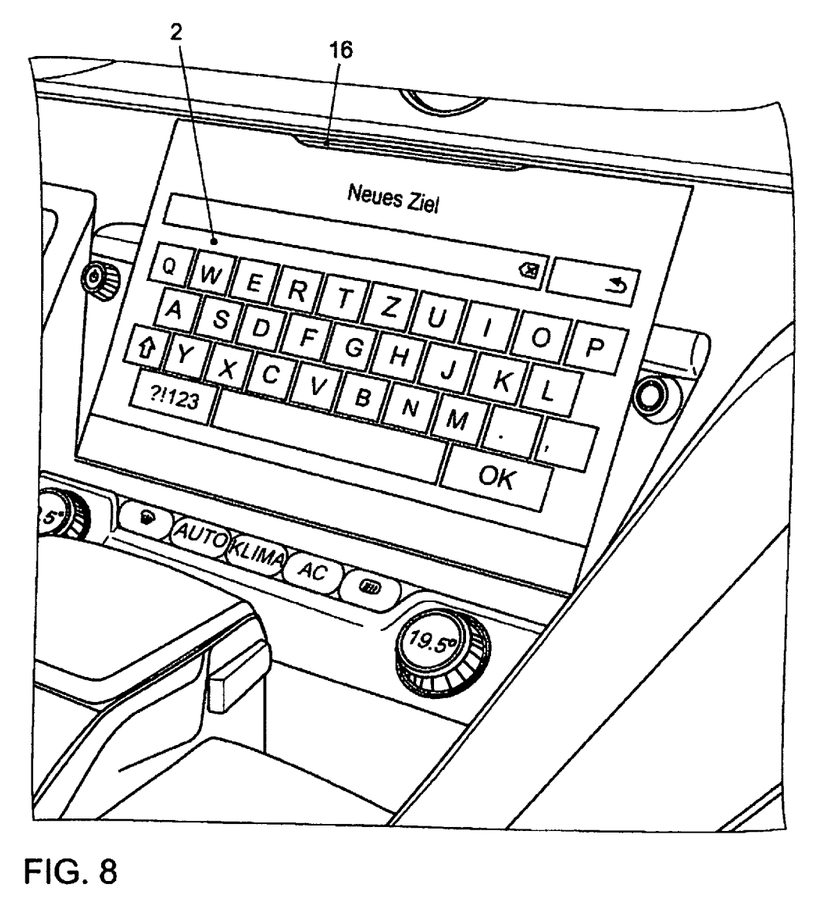

When the user wishes to input a new destination on the navigation system, he can use appropriate inputs to produce the display shown in FIG. 8 on the display panel 2. A keyboard appears for the input of a new destination. In addition, the special switching element 16 is presented again.

Figure 9:
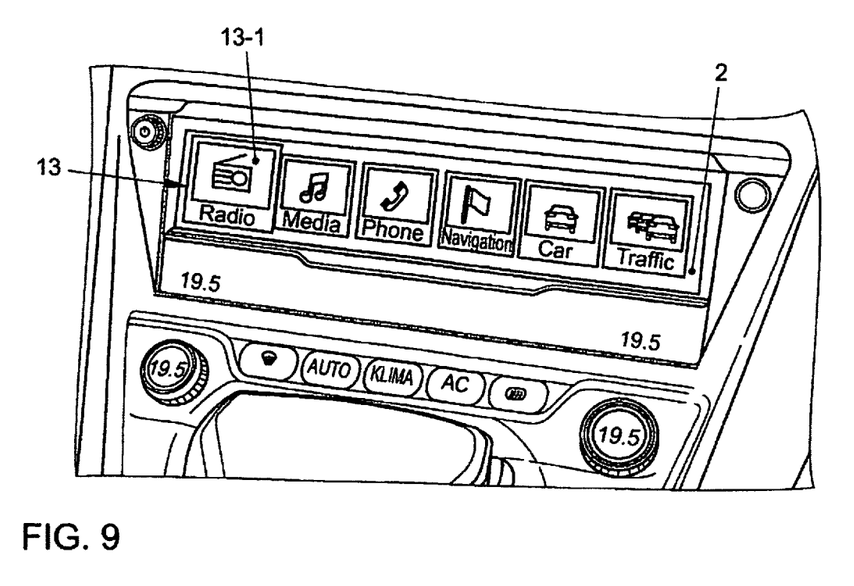
Figure 10:
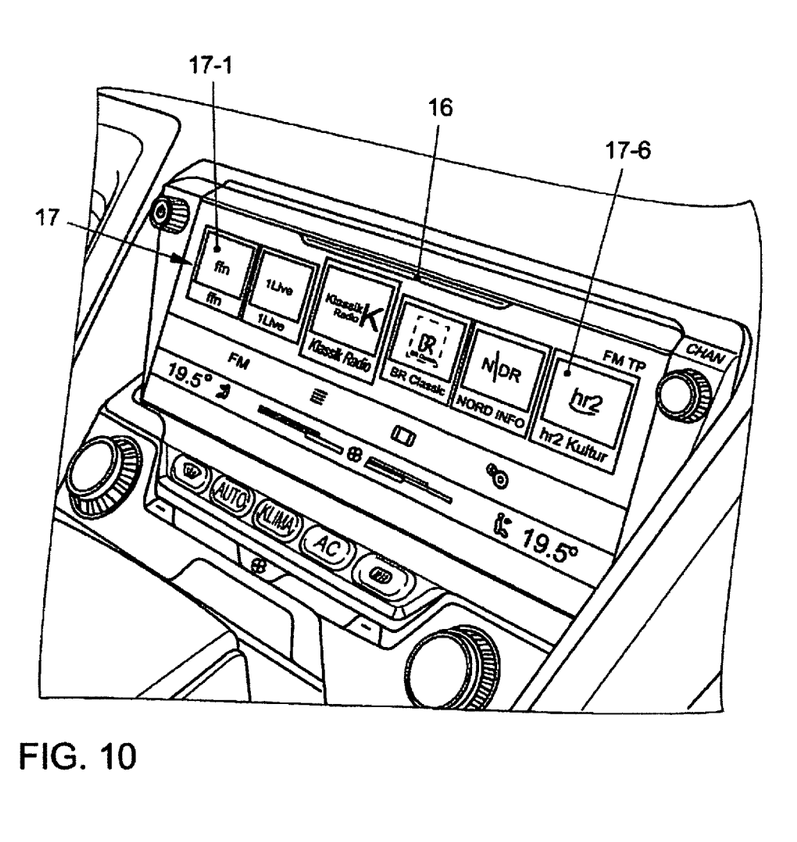

From the main menu 13, the user can also operate other devices of the vehicle 20. FIG. 9 shows the case in which the user has actuated the switching element 13-1 for the radio of the vehicle 20. Following actuation of the switching element 13-1, the presentation—shown in FIG. 10—of a menu 17 for the radio appears. Again, a plurality of switching elements 17-1 to 17-6 are presented, which in this case are associated with different stations of the radio. Furthermore, the special switching element 16 is displayed.

The function, arrangement and actuation of the special switching element 16 are explained in detail below:

The special switching element 16 has the form of an elongate bar that has its longitudinal side arranged at the edge, particularly at the upper edge, of the display panel 2. Apart from for the main menu 13, the special switching element 16 is displayed for all other menus and information presentations on the display panel 2 in this position on the display panel 2.

The special switching element 16 can be actuated by a swipe gesture. This swipe gesture can be carried out on the touch-sensitive surface 4 or in the detection area 8. The user either sweeps downward on the touch-sensitive surface 4 starting from the area in which the special switching element is presented, or he carries out a swipe gesture in the detection area 8 that involves the fingertips of one hand being moved quickly from top to bottom. When such a swipe gesture has been sensed by means of the input apparatus and the control apparatus 3, the control apparatus 3 produces an animation that involves the main menu 13 being moved from the edge of the display panel 2 at which the special switching element 16 is displayed, that is to say, in the present case, from the upper edge of the display panel 2, into the display within the first interval of time, so that the main menu 13 takes up an increasing area of the display panel 2 as time progresses. At the same time, the previously displayed menu, for example the menu 17, disappears as time progresses. Figuratively speaking, the main menu 13 is moved over the previously displayed menu until the latter is no longer displayed. After the first interval of time has elapsed, only the main menu 13 is then displayed.

If, following such actuation of the special switching element 16, no input from one of the switching elements 13-1 to 13-6 of the main menu 13 is sensed within a second interval of time, then the main menu 13 disappears again by means of an animation, as has been explained with reference to FIG. 5, and the menu displayed prior to the actuation of the special switching element 16, that is to say the menu 17, for example, is displayed again.

A vehicle contains various information and communication devices whose displays and information need to be presented. The size of the display panels that can be accommodated in the vehicle, so that particularly the driver of the vehicle can read off the displays, is very limited. To present the many and diverse operator control and display options, therefore, e.g. hierarchic operator control structures are used. A hierarchic operator control structure contains a multiplicity of menus that each have various associated menu items, alphanumeric information presentations and/or graphics. When a menu item is selected, a menu on a lower level of the hierarchic operator control structure, what is known as a submenu, opens. This submenu in turn comprises a plurality of submenu items. This structure can be continued over a plurality of hierarchy levels, so that the result is a complex ramification for the display on the display panel. Despite the complexity of the operator control structure, the user is intended to be able to use the operator control apparatus in the vehicle simply and intuitively.

To display the many and diverse pieces of information from the operator control apparatus flexibly, user-programmable displays are frequently used that display the menus of the operator control structure on a display panel. By way of example, EP 2 246 214 A1 describes an operator control method in which a main menu that comprises a plurality of menu items is displayed on the display panel. When one of the menu items is actuated, a submenu is displayed that in turn comprises a plurality of menu items.

WO 2013/053466 A2 describes a method of providing an operator control apparatus in a vehicle, in which the display panel is used to display a main menu of a hierarchic operator control structure. In this case, the main menu comprises a larger set of menu items, so that only a subset can be displayed on the display panel. The user can alter the displayed subset by means of an operator control process in this case.

LIST OF REFERENCE SYMBOLS

1 Display apparatus
2 Display panel
3 Control apparatus
4 Touch-sensitive surface, input apparatus
5 Data bus
6 Operator control apparatus
7 Sensing device
8 Detection area
9 Device of the vehicle
10 Device of the vehicle
11 Memory
12 Actuating object, fingertip, hand of the user
13 Main menu
13-1 to 13-6 Switching elements
14 Menu
14-1 to 14-6 Switching elements
16 Special switching elements
17 Menu
17-1 to 17-6 Switching elements
20 Vehicle

The invention claimed is:

1. An operator control method for operating a display panel of a transportation vehicle, the method comprising:
using the display panel arranged in the transportation vehicle to display a menu for an operator control structure, wherein the operator control structure comprises a main menu and a multiplicity of further menus, wherein upon initiation of the operator control structure the main menu is initially displayed,
capturing inputs via interaction with the display panel, wherein captured inputs bring about alteration of the displayed menu and actuate switching elements of the further menus, including capturing an initial actuation of one of the switching elements and responsively presenting animated movement of the main menu to reveal one of the further menus associated with the actuated switching element,
displaying a special switching element at an edge of the display panel for at least a plurality of menus from the multiplicity of further menus of the operator control structure, wherein the special switching element is actuated in response to a captured input as a swipe gesture capturing the special switching element, and
in response to actuation of the special switching element by the capture input, moving the main menu onto the display panel by transitioning from the edge at which the special switching element is displayed within a first interval of time so that the main menu takes up an increasing area of the display panel as time progresses and at the same time the previously displayed menu disappears as time progresses, wherein responsive to expiration of the first interval of time, the display panel presents only the main menu thereby indicating the change of the display panel to provide simple access to the main menu from any of the plurality of menus of the multiplicity of menus without negotiating a menu hierarchy.

2. The operator control method of claim 1, wherein the operator control structure is a hierarchic operator control structure in which the main menu is arranged on the hierarchically highest level.

3. The operator control method of claim 1, wherein for all menus of the operator control structure apart from the main menu, the special switching element is displayed at the edge of the display panel.

4. The operator control method of claim 1, wherein the special switching element is displayed in the same position for all menus apart from the main menu.

5. The operator control method of claim 1, wherein the special switching element is arranged at the upper edge of the display panel.

6. The operator control method of claim 1, wherein the menu displayed prior to the main menu is displayed again if no input from a switching element of the main menu has been sensed within a second interval of time.

7. The method of claim 1, wherein initiation of the operator control structure comprises starting the transportation vehicle.

8. An operator control apparatus in a vehicle, the operator control apparatus comprising:
a display panel;
a memory that stores data pertaining to an operator control structure that comprises a main menu and a multiplicity of further menus;
a control apparatus coupled to the memory and to the display panel that is configured to produce graphics data for presenting the further menus of the operator control structure on the display panel; and
an input apparatus that is configured to be used to capture inputs that can bring about alteration of the displayed menu and that can actuate switching elements of the menus,
wherein the controller is configured, at initialization of the operator control structure, to present the main menu having a number of switching elements and to capture an initial actuation of one of the switching elements and to responsively present animated movement of the main menu to reveal one of the further menus associated with the actuated switching element, and to present, for at least a plurality of menus from the multiplicity of further menus of the operator control structure, a special switching element at the edge of the display panel, the special switching element configured for actuation responsive to a swipe gesture catching the special switching element, and
wherein responsive to activation of the special switching element, the main menu moves incrementally to transition onto the display panel from the edge at which the special switching element is displayed and the previously displayed menu simultaneously disappears as time progresses until expiration of a first time interval, wherein responsive to expiration of the first time interval the display panel presents only the main menu thereby indicating the change of the display panel to provide simple access to the main menu from any of the plurality of menus of the multiplicity of menus without negotiating a menu hierarchy.

9. The operator control apparatus of claim 8, wherein the input apparatus comprises a touch-sensitive surface that is arranged on the display panel and on which the swipe gesture is sensed.

10. The operator control apparatus of claim 8, wherein the input apparatus comprises a sensing device that is configured to be used to sense a gesture carried out in a detection area, wherein the detection area is arranged in front of the display panel.

11. The control apparatus of claim 8, wherein initialization of the operator control structure comprises starting the transportation vehicle.

12. An operator control apparatus for a transportation vehicle, the operator control apparatus comprising:
   a display panel;
   a memory that stores data pertaining to an operator control structure that comprises a main menu and a multiplicity of further menus;
   a controller coupled with the memory and the display panel to produce graphics data for presenting the menus of the operator control structure on the display panel; and
   an input apparatus arranged to capture inputs that alter the displayed menu and to actuate switching elements of the menus,
   wherein the controller is configured, at initialization of the operator control structure, to present the main menu having a number of switching elements and to capture an initial actuation of one of the switching elements and to responsively present animated movement of the main menu to reveal one of the further menus associated with the actuated switching element, and to present a special switching element at the edge of the display panel for at least a plurality of menus from the multiplicity, the special switching element configured to be actuated by a swipe gesture capturing the special switching element, and
   wherein responsive to activation of the special switching element, the main menu moves incrementally to transition onto the display from the edge at which the special switching element is displayed and the previously displayed menu simultaneously disappears as time progresses, wherein responsive to expiration of a first time interval, the display panel presents only the main menu thereby indicating the change of the display panel to provide simple access to the main menu from any of the plurality of menus of the multiplicity of menus without negotiating a menu hierarchy.

13. The control apparatus of claim 12, wherein for all menus of the operator control structure apart from the main menu, the special switching element is displayed at the edge of the display panel.

14. The control apparatus of claim 12, wherein the menu displayed prior to the main menu is redisplayed if no input from a switching element of the main menu has been sensed within a second interval of time.

15. The control apparatus of claim 12, wherein the operator control structure is a hierarchic operator control structure in which the main menu is arranged on the hierarchically highest level.

16. The control apparatus of claim 12, wherein the special switching element is displayed at an upper longitudinal edge of the display panel, the special switching element is displayed at an upper longitudinal edge of the display panel.

17. The control apparatus of claim 12, wherein initialization of the operator control structure comprises starting the transportation vehicle.

\* \* \* \* \*